United States Patent [19]
McLellan

[11] 3,990,975
[45] Nov. 9, 1976

[54] RIGGING SYSTEM FOR AN ENDLESS OIL MOP

[75] Inventor: Charles McLellan, Slidell, La.

[73] Assignee: Oil Mop Inc., Belle Chasse, La.

[22] Filed: Aug. 4, 1975

[21] Appl. No.: 601,934

[52] U.S. Cl. .................. 210/242 AS; 210/DIG. 26
[51] Int. Cl.[2] ........................................ E02B 15/04
[58] Field of Search ........ 210/83, 30, 242, DIG. 21; 61/1 F

[56] References Cited
UNITED STATES PATENTS

| | | | |
|---|---|---|---|
| 3,534,858 | 10/1970 | Harrington | 210/DIG. 21 |
| 3,679,058 | 7/1972 | Smith | 210/242 |
| 3,700,593 | 10/1972 | Bezemer et al. | 210/242 |
| 3,701,258 | 10/1972 | Rhodes | 210/242 |
| 3,744,638 | 7/1973 | Rhodes | 210/242 |

Primary Examiner—Theodore A. Granger
Attorney, Agent, or Firm—Wilkinson, Mawhinney & Theibault

[57] ABSTRACT

The present disclosure is directed to a rigging system for causing an endless oil mop driven through an engine or motor driven wringer mechanism to make multiple passes over and through an oil contaminated body of water from the deck of a vessel. This is accomplished by using sampson posts on the deck of a vessel and connecting spars to the posts and buoyantly supporting the free ends of the spars and mounting mop pulleys at the end of each spar and one pulley between the spars on the side of the vessel at the water line.

3 Claims, 6 Drawing Figures

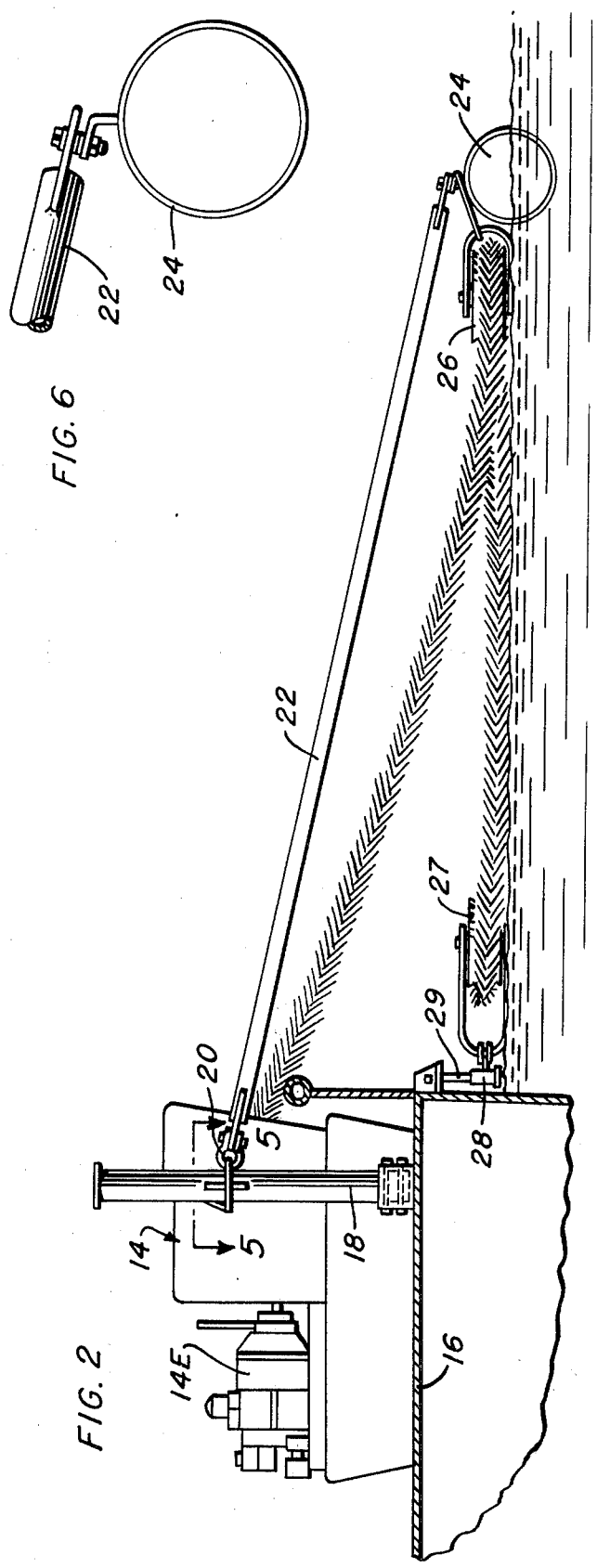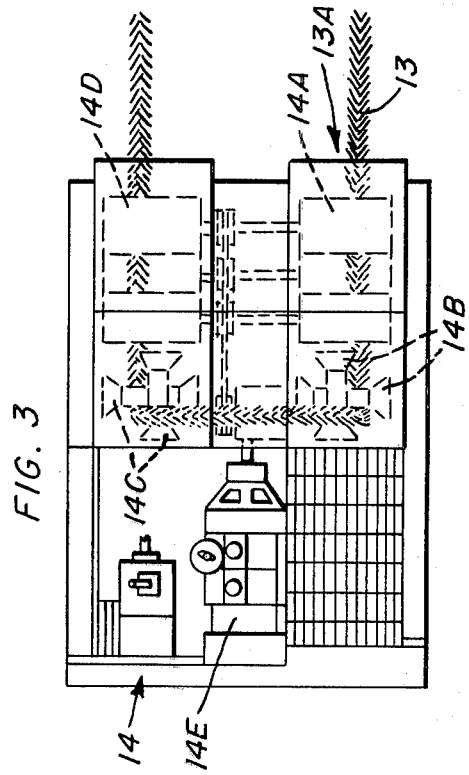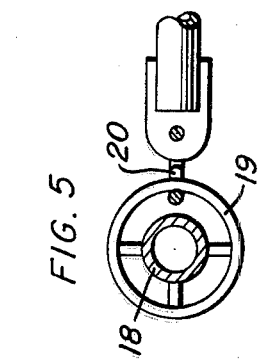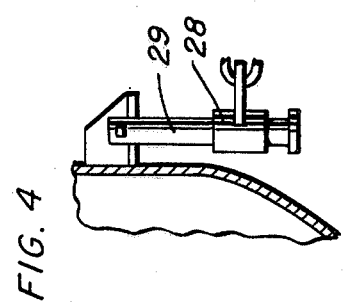

RIGGING SYSTEM FOR AN ENDLESS OIL MOP

An object of the present invention is to provide a rigging system for an oil mop on a water vehicle which can follow a spill area making multiple passes of an oil mop through the contaminated water that is to increase the surface area adsorbing material such as shown in U.S. Pat. Nos. 3,668,118 and 3,744,638.

A further object of the present invention is the provision of a rigging system for an endless oil mop driven from a wringer mechanism which will make multiple passes through the spill area to remove the oil from the water and save the oil and which is installed on a boat or other water vehicle which can be quickly moved to the spill area immediately set up to clean up an emergency spill.

With the foregoing and other objects in view the invention will be more fully described hereinafter and more particularly pointed out in the appended claims.

In the drawings in which like parts are denoted by reference characters throughout the several views:

FIG. 2 is a side elevational view of the rigging system of FIG. 1.

FIG. 3 is a top plan view of the endless mop drive and wringer mechanism.

FIG. 4 is an enlarged view of the middle mop pulley attachment to the vessel.

FIG. 5 is a horizontal section taken on the line 5—5 in FIG. 2 showing the spar attachment to the sampson post.

FIG. 6 is a side elevational view of the spar attachment to the float means.

Figure 1:
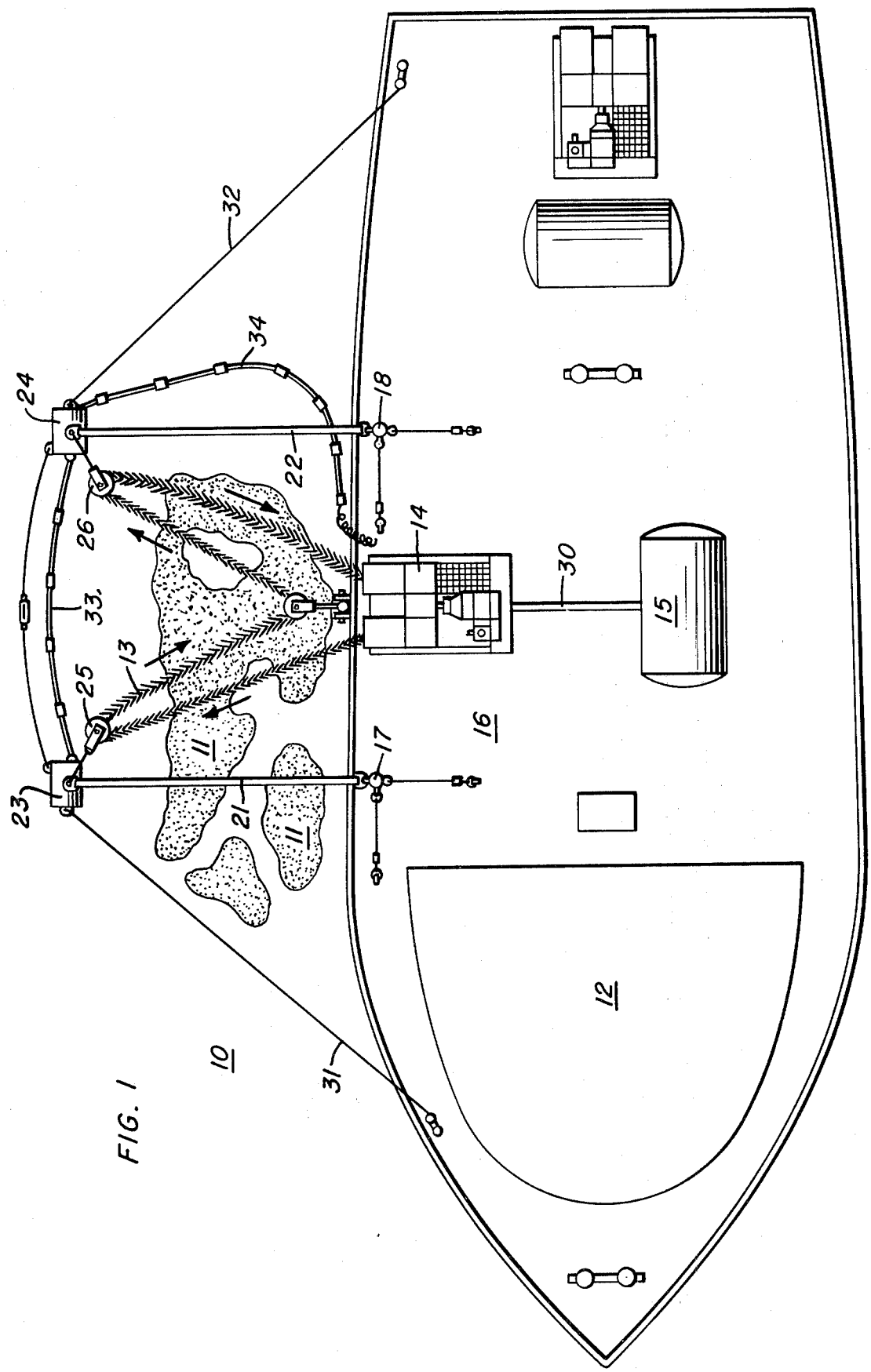
FIG. 1 is a top plan view of a vessel having the oil mop rigging system of the present invention installed thereon.

Referring now to the drawings and for the moment to FIG. 1, 10 designates a body of water upon which there has been an oil spill 11. A vessel 12 is sent to the site for picking up the oil with an oil mop 13 of the endless type arranged in multiple passes through the oil slick and driven by a mop wringer and drive mechanism 14 located on the deck of the vessel, the recovered oil is stored in a tank 15 on the deck of the vessel until the vessel returns to port.

The vessel has a main deck 16, and as seen in FIGS. 1 and 2 two sampson posts 17 and 18 are secured to the deck at opposite sides of the mop wringer 14 at one side of the ship. As shown in FIG. 5, a ring 19 is attached to each sampson post to receive an attaching ring 20 secured to one end of each of a pair of spars 21,22. The free end of each spar has secured thereto a buoyant float means 23,24. Also secured to the float and spar are mop pulleys 25,26. Located between the sampson posts 17,18 on the side of the vessel is a third mop pulley 27 having a sliding mount 28 which moves up and down over a guide 29 attached to the vessel hull.

As shown in FIG. 3, the mop wringer and drive mechanism 14 has an intake side 13A so that the mop 13 is drawn in by power driven squeezing rolls 14A, passed over guide rollers 14C and out through squeezing rolls 14D. The squeezing rolls 14A and 14D are driven by a motor or engine 14E. The oil adsorbed on the mop 13 after being squeezed by the rolls 14A and 14D is passed through a line 30 to a reservoir tank 15.

A bow and stern guy line 31,32 are secured between the deck of the vessel and buoyant means 23,24 to preserve substantial parallelism between the spars 21,22. Oil floatation control barriers 33 and 34 are employed to assist in confining the oil to be picked up. The mop 13 is driven in the direction of the arrows shown in FIG. 1. The mop continuously is passed through the water to absorb the oil from the water, leaving the water behind passes through the wringer mechanism 14 to remove the oil and return the mop to the water to pick up more oil. The mop is of the type shown and described in U.S. Pat. No. 3,668,118 and is made up of narrow thin gauge strips of polypropylene secured to a center pull multi-strand polypropylene line. The mop floats in water even when laden with oil.

What I claim is:

1. In combination with a vessel and an endless oil mop means for collecting a light liquid from the surface of a body of water by the adherence of said light liquid to said oil mop means, a rigging system for said endless oil mop means comprising a pair of spars with a first end of each spar pivotably connected to sampson posts spaced apart at one edge of the deck of said vessel, wringer means for cleaning liquid from said oil mop means, said wringer means located at the edge of said deck between said sampson posts, a first pulley for said endless oil mop means located adjacent said wringer means at the side of the vessel where the spars are located, float means for supporting the second end of each spar when the spars are arranged horizontally with the second end of each spar adjacent the surface of the water, pulley means comprising second and third pulleys located at the second end of each spar, continuous endless oil mop means constructed and arranged to have a first portion located away from the vessel and a second portion located between said first portion and the vessel, said first portion being supported by being roved through said first, second, and third pulleys, said second portion being supported by being roved through said second, third pulleys with the central portion thereof roved through said wringer means mounted on the deck of the vessel.

2. A rigging system as claimed in claim 1 further comprising a buoyant float barrier between said buoyant float means at the end of each spar and a second buoyant float barrier between the buoyant float means closest the stern of the vessel.

3. A rigging system as claimed in claim 2 further comprising spar positioning means connected between the free ends of the spars and the vessel hull to maintain the spars at a right angle to the longitudinal axis of the vessel.

* * * * *